(12) United States Patent
Heil

(10) Patent No.: US 6,435,209 B1
(45) Date of Patent: Aug. 20, 2002

(54) METHOD AND APPARATUS FOR PREVENTING ICE FORMATION IN WATER TOWERS

(76) Inventor: Howard Heil, 1761 Oxnard Dr., Downers Grove, IL (US) 60516

( * ) Notice: Subject to any disclaimer, the term of this patent is extended or adjusted under 35 U.S.C. 154(b) by 0 days.

(21) Appl. No.: 09/829,840

(22) Filed: Apr. 10, 2001

(51) Int. Cl.⁷ ............................................. E03B 11/12
(52) U.S. Cl. ...................................... 137/593; 137/334
(58) Field of Search ................................ 137/334, 593

(56) References Cited

U.S. PATENT DOCUMENTS

| | | | |
|---|---|---|---|
| 1,295,687 A | * 2/1919 | Bullard | 137/564 |
| 3,109,288 A | 11/1963 | Gross | 61/1 |
| 3,148,509 A | 9/1964 | Laurie | 61/6 |
| 3,193,260 A | 7/1965 | Lamb | 261/64 |
| 3,293,861 A | 12/1966 | Hinde | 61/1 |
| 3,318,098 A | 5/1967 | Hoddinott et al. | 61/1 |
| 4,279,537 A | 7/1981 | Tweedy | 405/61 |
| 4,304,740 A | 12/1981 | Cernoch | 261/121 |
| 4,337,152 A | 6/1982 | Lynch | 210/197 |
| 4,481,966 A | 11/1984 | Anderson | 137/59 |
| 4,664,143 A | 5/1987 | Thompson | 137/567 |
| 4,815,494 A | 3/1989 | Raikamo | 37/593 |
| 5,017,093 A | 5/1991 | Naes | 417/14 |
| 6,237,629 B1 | * 5/2001 | Zelch | 137/593 |

OTHER PUBLICATIONS

Brain, "How Water Towers Work," How Stuff Works http://www.howstuffworks.com (printed Aug. 23, 2000).

* cited by examiner

*Primary Examiner*—Gerald A. Michalsky
(74) *Attorney, Agent, or Firm*—McAndrews, Held & Malloy, Ltd.

(57) ABSTRACT

An elevated water tank having an improved means of preventing ice formation. The water tank is provided with an air supply line communicating the interior or the water tank to an external air compressor. The air compressor forces air through the air supply line into the water held in the water tank causing mixing of the water and generally perturbing the water to prevent ice formation on the surface of the water. The ice prevention system ensures the availability of water supply from the elevated water tank during the winter months when many water tanks freeze over. Furthermore, the ice prevention system eliminates the need for agitators and recirculation systems prone to failure or costly heating systems.

11 Claims, 2 Drawing Sheets

METHOD AND APPARATUS FOR PREVENTING ICE FORMATION IN WATER TOWERS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention generally relates to an apparatus for preventing ice formation in a water tower.

In most municipalities, a basic water system contains a water source, treatment plant, water pumps, water tower, and a distribution system. The beginning of the system and the source of most drinking water is either a well, river, or reservoir. This natural water is then treated in a water treatment plant to remove sediment and bacteria. The clean water is then pumped, at a pressure of 50 to 100 psi, into the water distribution system. A water tower is normally attached to the primary water distribution pipes between the water pumps and the water consumer.

A water tower is simply a large elevated water tank. The primary purpose of elevating a water tank is to provide water storage and water pressure. This water storage and pressure allows a municipality to size its water pumps for the average rather than peak demand, saving the community a lot of money. Water usage is normally at its highest during the day, usually peaking in the morning when everyone wakes up and showers. Similarly, water usage is much higher in the summer when people also water their lawn and gardens. Therefore, the municipality sizes its water pumps for the average use during a summer day. During the transient bursts when water demand is at its peak, greater than the water pumps can provide, the water tower makes up the difference. Then when demand falls, the water pumps supply the demand and refill the tower with any excess. More specifically, water is pumped up the pipe that runs from the ground to the base of the water tank, called the riser. When water demand requires, water flows out of the tank, down through the riser, and into the water system to meet demand.

During the winter, water usage drops significantly compared to summer usage. Furthermore, water usage usually will drop significantly throughout the night and early morning. This low volume of water use results in very little to no water being used from the water tower or requiring the tower to refill, allowing it to freeze over. When the water tower supply freezes over, the water transients are not absorbed.

To prevent freezing, some elevated tanks incorporate various heating systems. The riser is usually covered with insulation. In severe conditions, a heating system may also be installed that introduces heated water or steam into the water. Warm water or steam is usually injected in the base of the riser and the heat rises into the water tank to inhibit freezing. However, heating of the tank with warm water or steam amounts to a considerable expense for the municipality.

In extremely cold regions, some municipalities use submersible pumps or agitators in place of or in supplement to heating systems to prevent freezing. These devices mix warmer water from the center of the tank with colder water at the surface to prevent freezing. However, these devices are submerged within the water in the water tank and susceptible to failure. When these devices fail, air and water temperatures make it extremely difficult to retrieve them and repair them before ice begins to form within the tank.

Thus a need has long been felt for a system to prevent ice formation in water towers that does not including the expense of using heated water or steam or requiring mechanical devices inside the water tank. Such an ice prevention system is very desirable by municipalities in cold climates who require a water tower but can not afford the expense of current ice prevention methods. Therefore, it would be highly desirable to provide a method and apparatus for preventing ice formation in a water tower.

BRIEF SUMMARY OF THE INVENTION

The present invention relates to an improved method for preventing ice formation in a water tower. More specifically, compressed air is introduced into the water of the water tower to prevent ice formation. Use of compressed air will prevent ice formation while eliminating the need for submerged mechanical devices and eliminating the costs associated with other heating systems.

DETAILED DESCRIPTION OF THE PREFERRED EMBODIMENT

Figure 1:
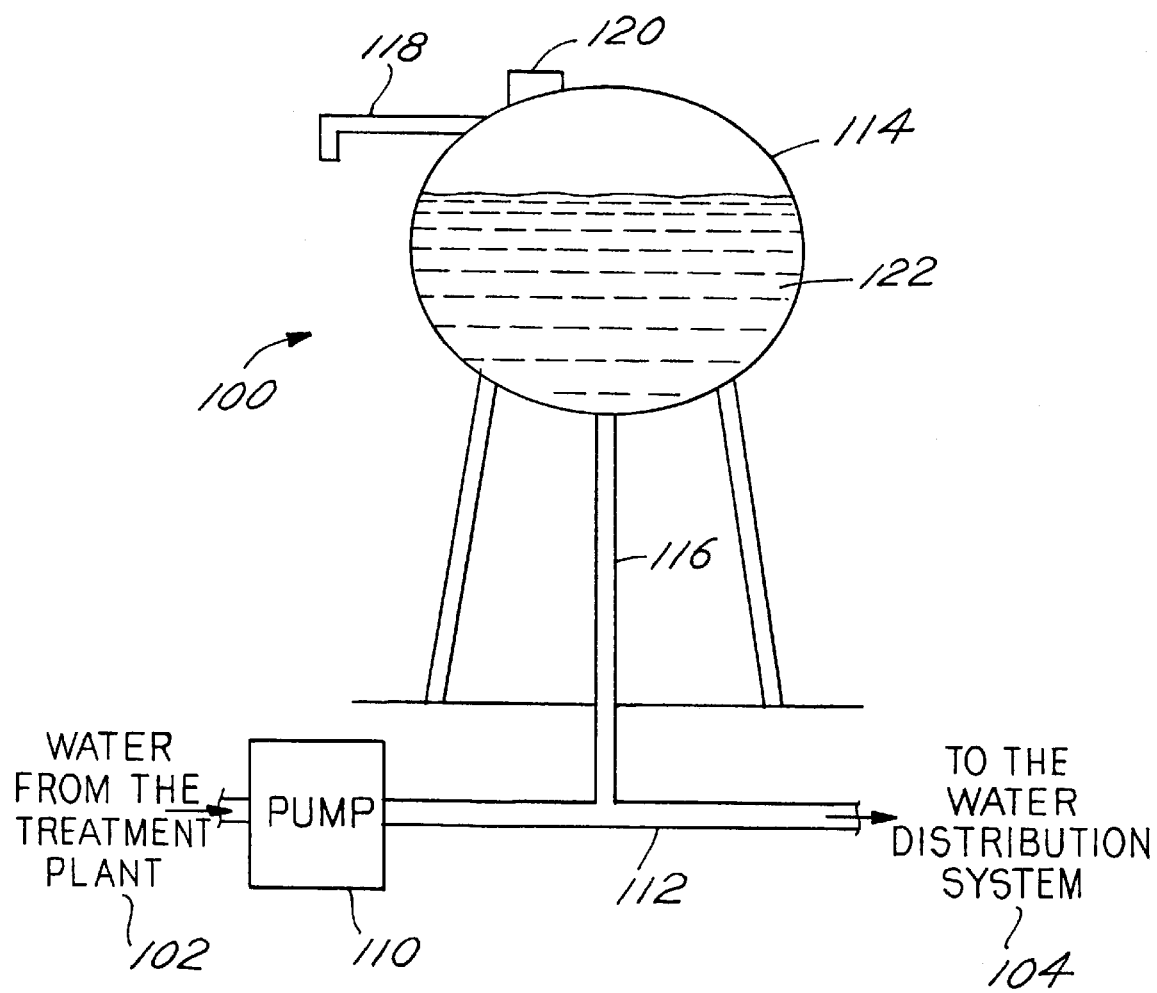
FIG. 1 is a schematic showing a water tower connected to a municipal water system.

FIG. 1 illustrates a water tower connected to a municipal water system 100. The water tower includes at least one water pump 110, a main water supply line 112, an elevated water tank 114, a riser 116, an over flow pipe 118, a manway 120, and stored water 122.

In operation, a municipality's water supply is treated in a water treatment plant (not shown). The treated water, indicated at 102, is then pumped into the main water supply line 112 via one or more water pumps 110. When water usage is at its average demand the treated water 102 is pumped through the main water supply line 112 into the water distribution system, indicated at 104.

When water usage is below average demand, treated water 102 not required by the water distribution system 104 is pumped via the water pumps 110 into the elevated water tank 114 through a pipe or riser 116. The riser 116 connects the elevated water tank 114 to main supply line 112. The elevated water tank 114 holds the stored water 122 until water demand by the water distribution system 104 is greater than the water pump(s) 110 can supply. At that time, the stored water 122 flows out of the elevated water tank 114 via the riser 116 and into the main supply line 112.

Figure 2:
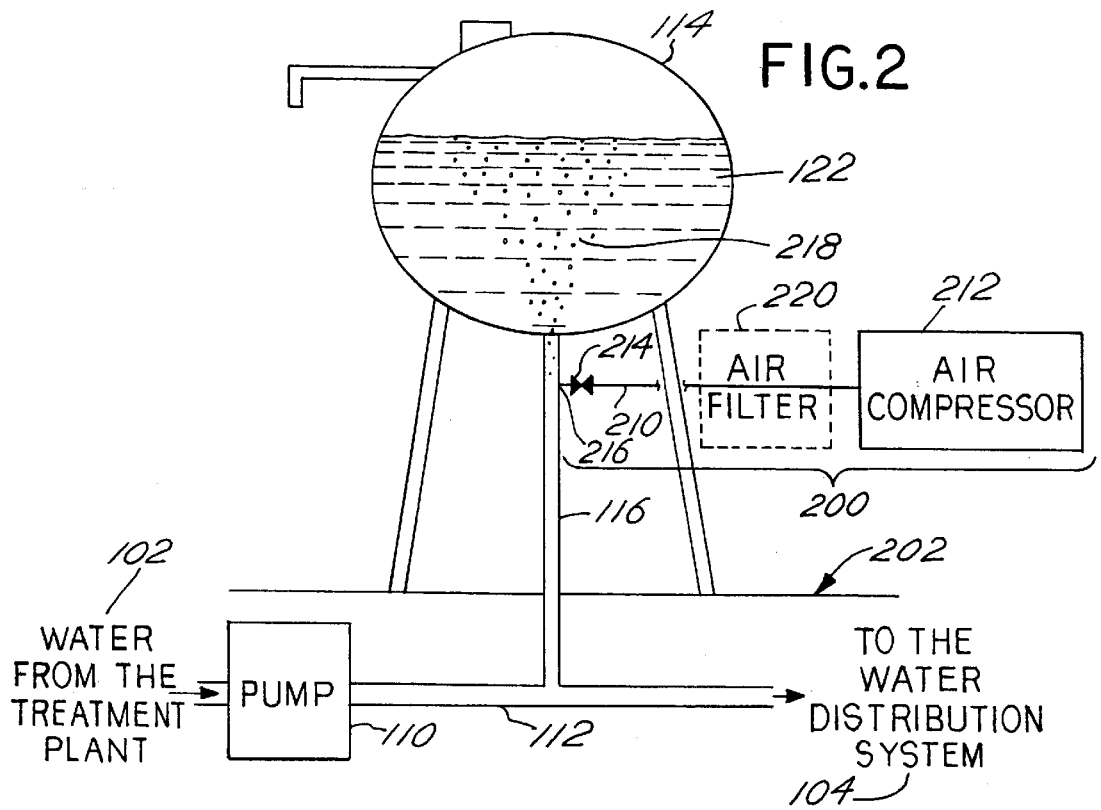
FIG. 2 is a schematic showing the ice prevention system connected to a water tower at the riser.

FIG. 2 illustrates an ice prevention system 200 connected to a water tower connected to a municipal water system 100. The ice prevention system 200 includes an air supply line 210, an air compressor 212, and a check valve 214.

The air supply line 210 is connected at one end to the air compressor 212. In the preferred embodiment the air compressor 212 is formed from an electric air compressor. The other end of the air supply line is connected to the riser 116 at point 216, which is above ground level, indicated at 202. The connection point 216 may be at least seven feet above ground level 202. The check valve 214 is located on the air supply line 210 close to the riser 116.

To prevent freezing of the stored water 122 in the elevated water tank 114, air is forced into the stored water 122. Compressed air (not shown) from the air compressor 212 is forced through the air supply line 210 and injected into the riser 116. Air bubbles 218 are generated and rise through the stored water 122 in the elevated water tank 114. The air bubbles 218 cause the mixing of warmer water located at the center of the elevated water tank 114 with colder water located at the surface of the stored water 122 in the elevated water tank 114, and generally perturb the water, preventing ice formation on the surface of the stored water 122.

The air supply line 210 also includes a check valve 214 located in close proximity to the riser 116 to prevent water from flowing back into the air line 210 when the air compressor 212 is stopped or fails. The air supply line 210 connects to the riser 116 at a point 216 located above ground level 202. This prevents air from the air supply line 210 from entering the main supply line 112 while the elevated water tank 114 is discharging water downwardly through the riser 116.

In extremely cold regions, an air heater 220 may be used to heat the compressed air in the air supply line 210 to provide additional ice prevention. The air heater 220 may be located at any convenient location on the air supply line 210.

Figure 3:
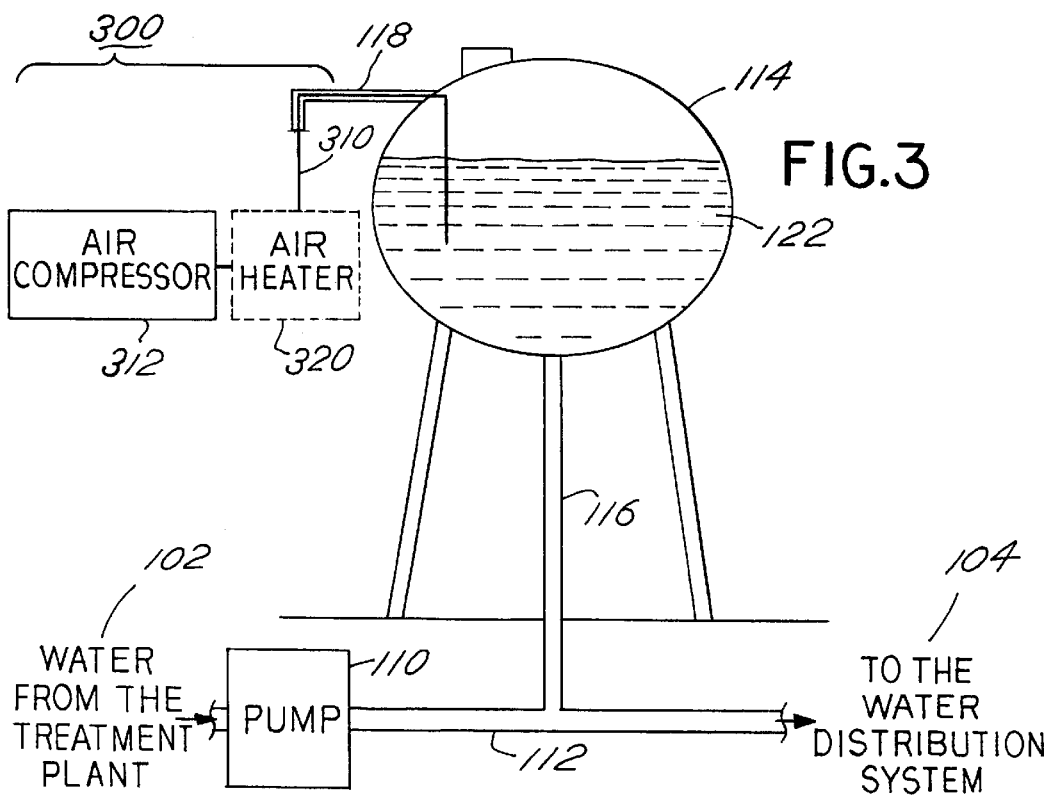
FIG. 3 is a schematic showing the ice prevention system connected to a water tower through the overflow pipe.

FIG. 3 illustrates a second embodiment of the invention. An ice prevention system 300 is connected to a water tower connected to a municipal water system 100. The ice prevention system 300 includes an air supply line 310 and an air compressor 312.

The air supply line 310 is connected at one end to the air compressor 312. In the preferred embodiment the air compressor 312 is formed from an electric air compressor. The other end of the air supply line 310 enters the elevated water tank 114 through the overflow pipe 118. The air supply line 310 extends along the inside wall of the elevated water tank 114 and terminates at a point located within the elevated water tank 114 such that it is submerged within stored water 122 in the elevated water tank 114.

In this embodiment of the invention, compressed air is injection into stored water 122 through the air supply line 310 by the air compressor 312 to prevent freezing of the stored water 122 in the elevated water tank 114. Compressed air from the air compressor 312 is forced through the air supply line 310 and injected into the stored water 122. Air bubbles (not shown) are generated and rise through the stored water 122 in the elevated water tank 114. The air bubbles cause the mixing of warmer water located at the center of the elevated water tank 114 with colder water located at the surface of the stored water 122 in the elevated water tank 114, and generally perturb the water, preventing ice formation on the surface of the stored water 122.

In extremely cold regions, an air heater 320 may be included to heat the compressed air in the air supply line 310 to provide additional ice prevention. The air heater 320 may be located at any convenient location on the air supply line 310.

Although FIGS. 2 and 3 illustrate the preferred embodiment of the ice prevention system 200, 300, alternate embodiments may also be used. For example, instead of using an electric compressor 212, 312 an alternative type of compressor, such as a gas powered compressor, may be used.

While particular elements, embodiments and applications of the present invention have been shown and described, it is understood that the invention is not limited thereto since modifications may be made by those skilled in the art, particularly in light of the foregoing teaching. It is therefore contemplated by the appended claims to cover such modifications and incorporate those features which come within the spirit and scope of the invention.

What is claimed is:

1. An elevated water tank comprising:

a water tank;

a riser for pumping water into said water tank;

an air supply line connected to said riser for entry of air into said riser; and an air compressor connected to said air supply line and operable for forcing air into said water tank via said riser.

2. An elevated water tank according to claim 1 wherein said riser operates to discharge said water tank.

3. An elevated water tank according to claim 1 and further including a check valve disposed at a point in said air supply line for checking water flow.

4. An elevated water tank according to claim 1 and further including an air heating means operatively connected to said air supply line for heating air in said air supply line.

5. An elevated water tank according to claim 4 wherein said air heating means heats air after being forced from said air compressor.

6. An elevated water tank according to claim 1 wherein said air supply line is connected to said riser at a connection point of sufficient height to prevent air bubbles from flowing down the riser when the water tank is in a discharge mode.

7. An elevated water tank according to claim 6 wherein said connection point is at least seven feet above ground level.

8. An elevated water tank comprising:

a water tank;

an overflow outlet;

a riser for pumping water into said water tank;

an air supply line leading through said overflow outlet and into the interior of said water tank; and an air compressor connected to said air supply line and operable for forcing air into said water tank via said air supply line.

9. An elevated water tank according to claim 8 wherein said riser operates to discharge said water tank.

10. An elevated water tank according to claim 8 and further including an air heating means operably connected to said air supply line for heating air in said air supply line.

11. An elevated water tank according to claim 10 wherein said air heating means heats air after being forced from said air compressor.

* * * * *